United States Patent
Shimakawa et al.

[11] Patent Number: 5,817,435
[45] Date of Patent: Oct. 6, 1998

[54] SEALED ALKALINE STORAGE BATTERY

[75] Inventors: Shinichi Shimakawa, Moriguchi; Shinji Hamada, Hirakata; Hiromu Matsuda, Kawabe-gun; Manabu Kakino, Uji; Munehisa Ikoma, Shiki-gun, all of Japan

[73] Assignee: Matsushita Electric Industrial Co., Ltd., Osaka-fu, Japan

[21] Appl. No.: 465,159

[22] Filed: Jun. 5, 1995

[30] Foreign Application Priority Data

Jul. 5, 1994 [JP] Japan ................................ 6-153645

[51] Int. Cl.⁶ ...................................... H01M 2/02
[52] U.S. Cl. ........................... 429/176; 429/120; 429/206
[58] Field of Search ..................... 429/120, 176, 429/206

[56] References Cited

U.S. PATENT DOCUMENTS

| | | | |
|---|---|---|---|
| 1,152,247 | 8/1915 | Walker | 429/120 X |
| 2,385,127 | 9/1945 | Carlile | 429/120 X |
| 5,073,620 | 12/1991 | Sanada et al. | |

FOREIGN PATENT DOCUMENTS

| | | |
|---|---|---|
| 0 545 399 A1 | 6/1993 | European Pat. Off. |
| A 2 277 440 | 1/1976 | France . |
| A 26 31 489 | 2/1977 | Germany . |
| HEI 3-291867 | 12/1991 | Japan . |
| A 6 203814 | 7/1994 | Japan . |

*Primary Examiner*—John S. Maples
*Attorney, Agent, or Firm*—Panitch Schwarze Jacobs & Nadel, P.C.

[57] ABSTRACT

A casing of sealed alkaline storage battery to be stacked in plural number in one direction, each provided with a safety vent; each casing is made of a polymer alloy which mainly comprises polyphenylene ether, polystyrene and an elastomer; at least one outersurface of the casing has a plurality of vertical protrusion ribs thereby to form vertical ventilation spaces through which a cooling medium passes; the vertical ribs formed on an outer surface of the casing have a protrusion height of 1 to 2 mm, the interval between ribs of 7 to 15 mm, rib width of 3 to 10 mm; thickness of inter-rib portion of casing are 1 to 3 mm, and those at the parts of short side walls 2 to 4 mm.

15 Claims, 4 Drawing Sheets

SEALED ALKALINE STORAGE BATTERY

FIELD OF THE INVENTION

The present invention relates to a sealed alkaline storage battery of a comparatively large capacity, and particularly to an improvement of a casing of such a battery.

BACKGROUND OF THE INVENTION

Sealed alkaline storage batteries which typically include nickel-cadmium storage batteries and nickel-metal hydride storage batteries are widely used as power sources for portable apparatuses such as a video tape recorder, a laptop computer and a portable telephone owing to their high energy density and reliability. Each cell of these batteries has a metal casing of a cylindrical or rectangular shape, and is a small-sized sealed alkaline storage battery of which capacity is about 0.5 to 3 Ah. In practical applications, several or several tens of cells are usually accommodated in a synthetic resin casing or tube.

These small-sized sealed alkaline storage batteries have a battery capacity as small as about 0.5 to 3 Ah, and hence respectively generate only a small amount of heat during a charging or discharging period.

Therefore, even in case of using such batteries in casing or tube, an appropriate balance has been established between heat generation and heat radiation. Consequently, no significant problem has arisen with regard to the temperature rise of the battery. The electrodes of the alkaline storage battery expand as a result of repetitive charging and discharging processes. Since the casing is made of a metal and has a cylindrical shape, the expansion of the electrodes does not produce a serious problem such as deformation of the casing. Even in the case where the casing has a rectangular shape, casing or the like does not need special design, since the battery is small in size.

However, recently there is a strong demand for medium and large-sized batteries (--a medium-sized battery is defined as that having a capacity of 10 to 100 Ah, a large-sized battery as that having a capacity of above 100 Ah; and the number of cells used in the battery ranges from several to several hundreds for either type--), which have a high energy density and reliability, as a mobile power source for various apparatuses ranging from a home-use appliance to an electric vehicle. Such medium and large-sized batteries, for example, an open-type nickel-cadmium storage battery and a lead-acid storage battery are used for energy storage, an uninterruptible power source, etc. However, these batteries have a disadvantage of the need of troublesome maintenance such as the addition of an electrolyte solution during the lifetime. When a battery is to be used as a mobile power source for various apparatuses ranging from a home-use appliance to an electric vehicle, therefore, the battery is required to be maintenance-free or have a sealed configuration.

As described above, in the case where an alkaline storage battery is used as a mobile power source for various apparatuses ranging from a home-use appliance to an electric vehicle, the battery is required to attain both a sealed configuration and an increase of the capacity to the medium or large size. More specifically, in order to increase the capacity and voltage of a module battery, it is necessary to connect a large number of cells in series besides sealing the cells.

A battery generates reaction heat and Joule's heat due to the electrode reaction during charging and discharging processes. The increased capacity with sealed configuration of a battery causes increase of the amount of generated heat. As the result, heat radiation to the outside of the battery is retarded, and the generated heat is accumulated within the battery. Consequently, the internal temperature of such a battery is higher than that of a small-sized battery. In a module battery consisting of a series connection of such large capacity cells, or a pack battery consisting of a series connection of module batteries, several tens to several hundreds of cells are arranged in a contiguous manner. Therefore, the retardation of heat radiation is further enhanced so that the temperature in the battery is further raised.

In order to solve the problems, Japanese Laid-Open Patent Publication No. Hei 3-291867 proposes an air circulation type heat radiation means for a storage battery system which has a large number of cells each consisting of positive and negative electrodes and an electrolyte and generating heat during a charging process In the proposed air circulation type heat radiation means, a space for allowing air to flow therethrough is formed between the cells, and a ratio of the space width to the cell width is set to a range of 0.1 to 1.0.

Similarly to the casing of a conventional lead-acid storage battery for use in an automobile, and in view of a reduced weight, the casing of such a battery for a mobile power source is made of a synthetic resin which mainly contains polypropylene.

When a casing made of polypropylene is used in an alkaline storage battery for a relatively large capacity mobile power source as described above, there arise the following problems:

(1) In a lead-acid storage battery, even when it is of the sealed type, the internal pressure due to charging rises to only about 0.05 MPa. In contrast, in a sealed alkaline storage battery, the internal pressure rise during the charging process reaches such high pressure as 0.2 to 0.4 MPa. In the case where a battery is used outdoors as a mobile power source under a high temperature environment for a long term, particularly when the battery is used or left in a charged condition, the casing of the battery is kept receiving an internal pressure of about 0.2 to 0.4 MPa or more. In such a case, a battery casing made of polypropylene has a danger of breakage due to creep deformation. In the case where charging and discharging cycles are repeated 1,000 or more times under a outdoor high temperature environment, a battery casing made of polypropylene has a danger of breakage due to mechanical fatigue caused by the internal pressure change, and hence such a casing is not sufficient in long-term reliability and safety.

(2) A battery casing made of polypropylene is expanded by the internal pressure rise of the battery due to repetitive charging and discharging processes, because the power generating elements expand. This expansion reduces the width of the space for air flow, whereby the heat radiation efficiency of the battery is largely lowered so that the performances of the battery such as the cycle life are impaired. In order to maintain the space between cells constant, the mechanical strength of the battery casing must be increased. To increase the strength of a casing, it is necessary to increase thickness of the casing at the expense of increased weight and volume of the casing. Thereby, the weight and volume of the battery are increased and hence the energy density of the battery is lowered.

(3) In the case where the battery casing is expanded and deformed by the internal pressure rise of the battery, a space is formed between the power generating elements and the battery casing. The generation of the space between the power generating elements and the battery casing causes great decrease of the rate of transmission of heat generated in the power generating elements to the battery casing. Accordingly, it is required to keep the battery casing in contact with the power generating elements.

(4) In an application to a mobile power source, a module battery consisting of 5 to 40 stacked cells, or a pack battery consisting of 2 or more module batteries or equivalent to a set of about 10 to 300 cells is used in general. Under such configuration, variations or inuniformities of battery performances such as the capacity must be decreased, and improvement of battery performances such as the energy density must be attained. For using a battery in an automobile, such consideration and countermeasures must be particularly taken as preventing displacement due to vibrations, improving impact resistance and providing incombustibility, in view of a collision accident. Furthermore, consideration must be made against stress corrosion crack due to deposition of machine oil and the like in the assembly line or during maintenance.

SUMMARY OF THE INVENTION

The present invention provides a sealed alkaline storage battery, particularly a medium or large-sized sealed alkaline storage battery which has strength sufficient for preventing a casing of the battery from destruction by creep deformation or fatigue after a long-term use under outdoor and high temperature environments or repetitive charging and discharging processes. The battery in accordance with the present invention has an improved mechanical strength against vibration and impact particularly at use in an automobile, and which has an improved long-term reliability.

Furthermore, the present invention provides a sealed alkaline storage battery, particularly a medium or large-sized sealed alkaline storage battery which is free from lowering of the energy density of a module battery or a pack battery, which can efficiently dissipate heat generated in the battery during charging and discharging processes, and which has little variation or scatter in performance.

The above-mentioned improvement is attained by configuring a sealed alkaline storage battery in which power generating elements and an alkaline electrolyte are accommodated in a battery casing made of a synthetic resin and which is provided with a safety vent, so that a polymer alloy comprising polyphenylene ether (hereinafter referred to "PPE") and polystyrene (hereinafter referred to "PS") can be used as the material of the casing. Particularly, it is preferable to configure the casing by a polymer alloy mainly comprising PPE and PS and also containing as an additive elastomer in a small amount, preferably 15 wt % or less of the whole. The elastomer provides the whole of the resin with rubber elasticity and lowers the glass transition temperature.

The present invention is accomplished as a result of various investigations on a material of a casing of a sealed alkaline storage battery which uses plural stacked cells. And the present invention is based on the finding that a polymer alloy comprising PPE and PS, particularly a polymer alloy of PPE, PS and an elastomer exhibits excellent moldability and mechanical properties at a high temperature, and such a polymer can provide a practical sealed alkaline storage battery.

While novel features of the invention are set forth in the preceding, the invention, both as to organization and content, can be further understood and appreciated, along with other objects and features thereof, from the following detailed description and example when taken in conjunction with the attached drawings.

DESCRIPTION OF THE PREFERRED EMBODIMENT

PPE has alkali resistance, and exhibits excellent mechanical strength in a wide range from a low temperature to a high temperature. Particularly, PPE is excellent in rigidity (bending elastic modulus), impact resistance (Izod impact resistance), and creep characteristics. PPE has a heat distortion temperature of about 170° to 180° C. under the standards described later, and a glass transition temperature of about 220° C.

Although PPE has excellent features as described above, PPE has low flow properties, and hence is poor in moldability, so that a residual strain remains after molding resulting in a high proportion defective in the process of molding a battery casing. Therefore, PPE alone is not suitable for a practical use.

On the other hand, PS has alkali resistance and is excellent in moldability. For example, PS has a mold shrinkage factor of about 0.3 to 0.6%, and a melt flow rate (hereinafter referred to "MFR") of about 15 to 30 g/(10 min.). Although PS has a sufficient rigidity at ordinary temperature, PS has a heat distortion temperature as low as about 80° C., so that the bending elastic modulus at about 70° C. is no more than 1,000 MPa or PS is insufficient in rigidity. Furthermore, PS has a glass transition temperature of about 100° C. and an Izod impact value of 100 J/m, or is poor in impact resistance.

In contrast, a polymer alloy of PPE and PS is more excellent in moldability than PPE alone, so that a production process using injection molding is easily conducted. The MFR of the polymer alloy can be improved to 10 to 15 g/(10 min.) at 300° C.

The heat distortion temperature of the polymer alloy is high or about 120° C. as compared with that of PS alone. Therefore, the polymer alloy exhibits superior mechanical strength also at a higher temperature and has a bending elastic modulus of about 1,700 to 2,000 MPa at about 80° C. Furthermore, the Izod impact value is improved to about 200 J/m. Regarding creep characteristics, when the tensile stress in a tensile creep test according to JIS (Japanese Industrial Standards) K-7115 is 10 MPa, the creep strain after 1,000 hours is 2% or less. JIS K-7115 is almost corresponding to ISO (International Standard) 899.

When the battery is to be used as a mobile power source such as an application in an automobile, addition of an elastomer in a range of 15 wt % or less of the whole improves the Izod impact value to about 300 J/m at the maximum, whereby impact resistance can be improved As a result of the above-mentioned alloying process, a polymer alloy of the below-mentioned characteristics can be obtained; the bending elastic modulus is about 1,900 to 3,000 MPa; the flexural strength is 50 to 100 MPa; the heat distortion temperature at a load of 1.82 MPa in accordance with JIS K-6871 is 100° C. or higher; and the creep strain after 1,000 hours is 2% or less when the tensile stress in a tensile creep test in accordance with JIS K-7115 is 10 MPa. JIS K-6871 is almost corresponding to ISO (International Standard) 1622 and ASTM (American Society for Testing and Materials) D-648. JIS K-7115 is almost corresponding to ISO 899.

When the outer surface of the casing is coated with a fluorocarbon resin or a polyolefin resin, the chemical resistivity is improved.

Examples of the configuration of the battery casing according to the present invention, and a module battery and a cell of a sealed alkaline storage battery using the casing will be described with reference to the drawings.

Figure 3:
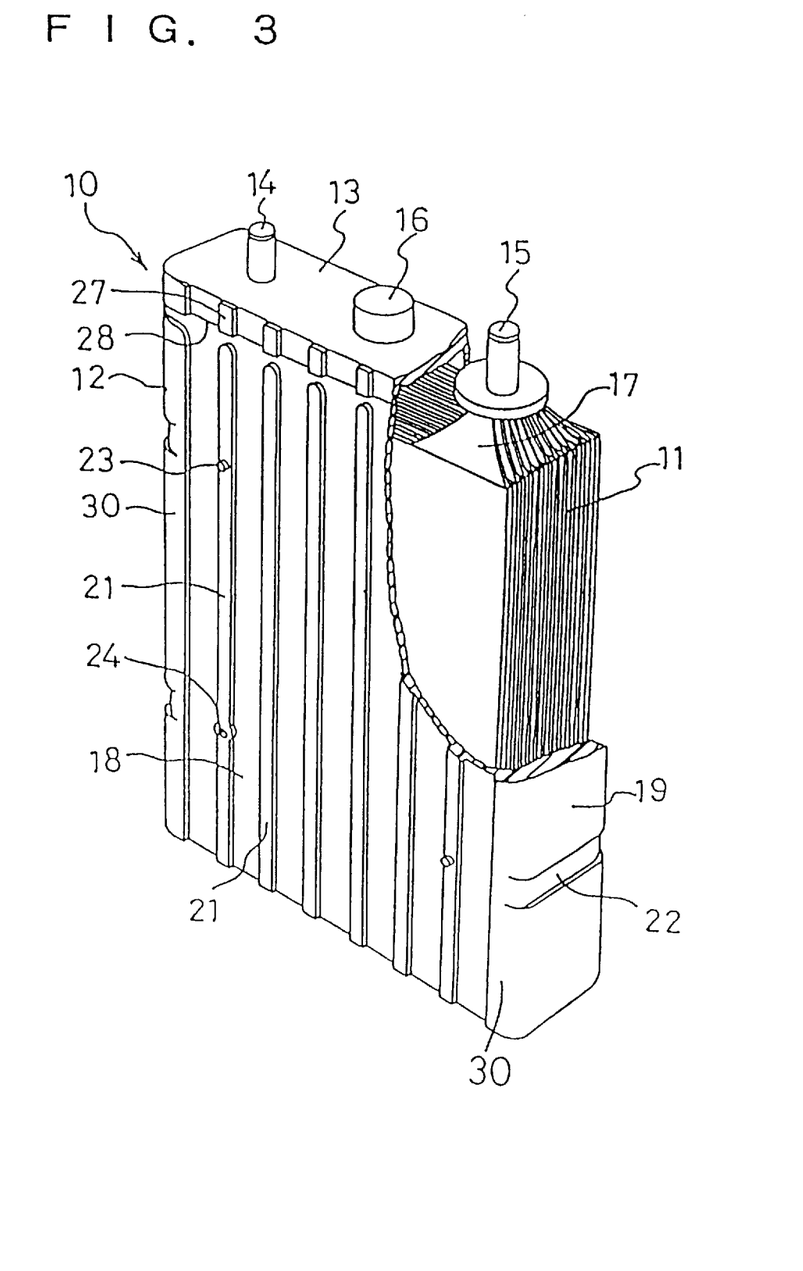
FIG. 3 is a partially-cutaway perspective view of a cell of a sealed alkaline storage battery of an embodiment of the present invention.

A cell designated by numeral 10 comprises a battery casing 12 containing an electrode group 11 and an electrolyte, and a lid 13 which is thermally welded to an upper opening of the battery casing 12. The electrode group 11 has a stack of positive and negative electrode plates and separators. Both the battery casing 12 and the lid 13 are formed by molding a polymer alloy comprising PPE, PS and an elastomer (for example, styrene-butadiene rubber, butadiene rubber or ethylene-propylene terpolymer etc.). The battery casing 12 has dimensions of 35 mm×120 mm×160 mm. Positive and negative terminals 14 and 15 which are made of nickel-plated iron, and a safety vent 16 are fixed to the lid 13. The negative terminal 15 has a hanging portion (not shown) at the lower end to which lead members 17 of the negative electrode plates are connected by means of welding. The upper portion of the negative terminal is attached to the lid 13 in liquid and gas tight fashion. Although not shown, lead members of the positive electrode plates are similarly connected to the lower end of the positive terminal 14.

Figure 1:
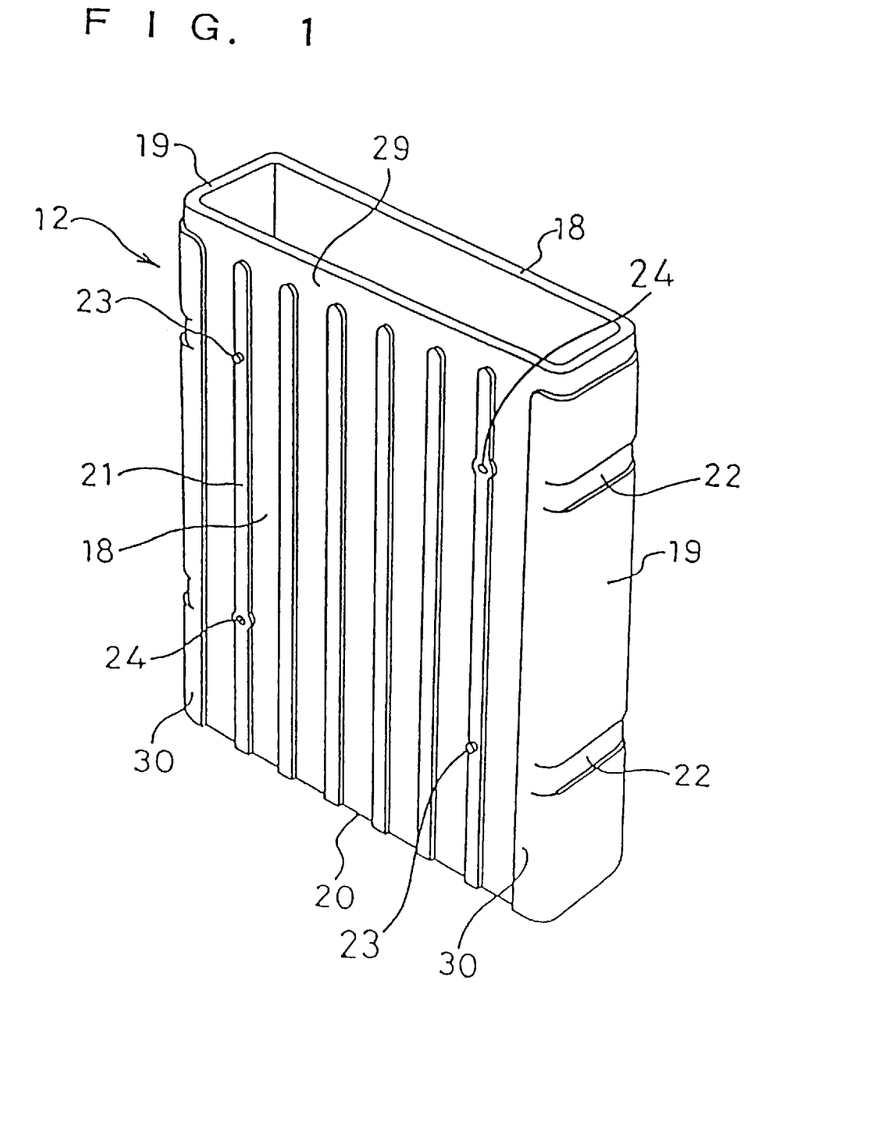
FIG. 1 is an upward perspective view of a battery casing used in the embodiment.
Figure 2:
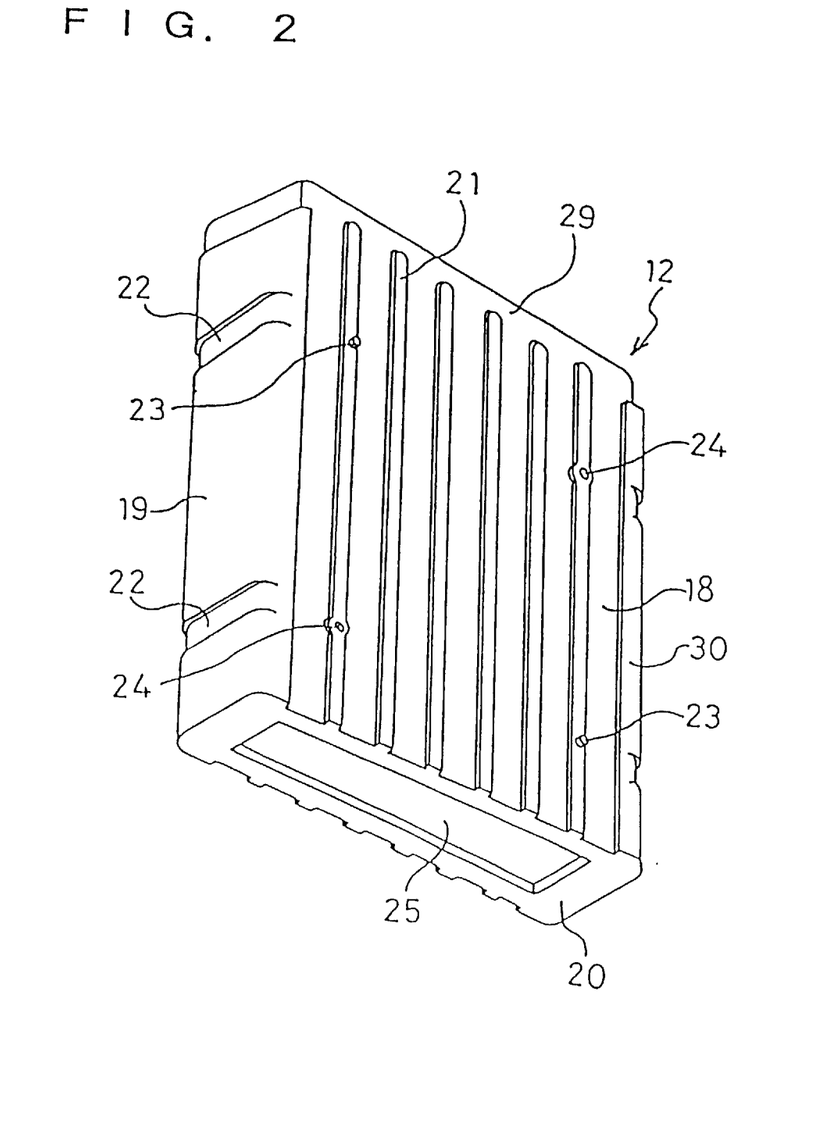
FIG. 2 is a downward perspective view of the battery casing.

The casing 12 comprises wider side walls 18 which are to be connected to each other by stacking, narrower side walls 19 in the other sides, and a bottom wall 20. On the outer surfaces of the side walls 18, longitudinal ribs 21, which are to be butted to the corresponding ribs of the wider walls of the oppositely disposed cells, are formed at substantially regular intervals and in a parallel manner. Two recesses 22 for positioning binding members which will be described later are formed on the outer surface of each side walls 19. The ribs at left end and right end have a protrusion 23 and a recess 24 for accurately positioning the butted cells, at positions in vertically inverted relationships As shown in FIG. 2, a recess 25 is formed at the center portion of the outer surface of the bottom wall 20 of the casing.

As shown in FIG. 3, the lid 13 has ribs 27 similar to the ribs 21 of the casing 12, on the outer surfaces of wider side walls 18.

The lid 13 and the battery casing 12 is welded at a welding portion 28. Margin of the welding portion 28 externally protruded by welding are removed away by grinding, for smoothing the outer surface and securing vertical air channel between the ribs.

The upper portion of the casing 12 which is designated by numeral 29 and in which the ribs 21 are not formed functions as the welding margin for the welding of the casing 12 and the lid 13.

The side walls 19 of the casing 12 are thicker than the side walls 18, and are formed so as to be continuous with ribs 30 which are formed at the outermost sides of each side wall 18.

The lid 13 has a similar configuration with respect to its section by horizontal plane.

Figure 4:
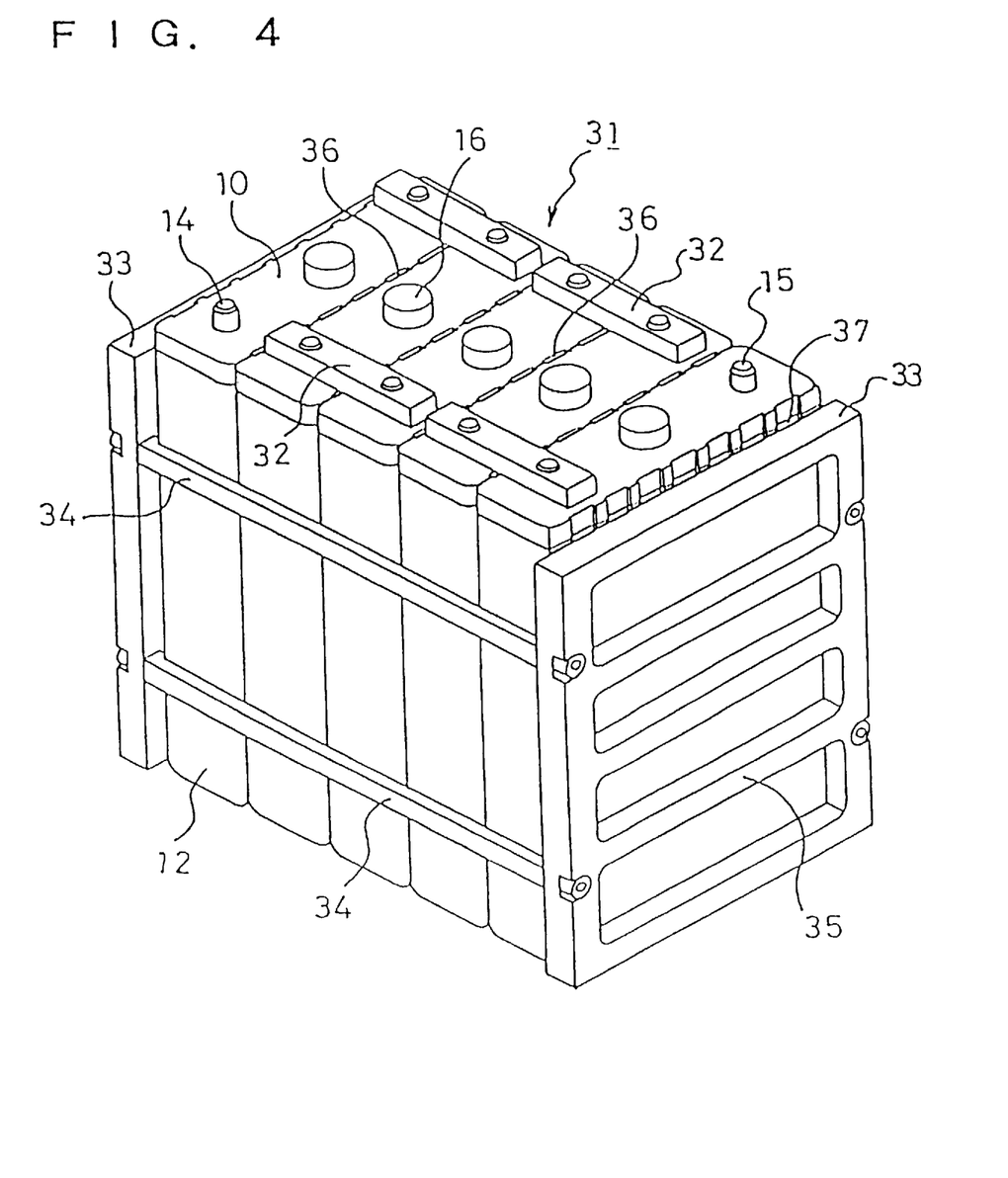
FIG. 4 is a perspective view of a module battery used in the embodiment.

FIG. 4 shows a module battery 31 in which five cells 10 having the above-mentioned configuration are stacked and connected in series. Contiguous cells are mutually positioned by butting the ribs 21 and 30 (in FIG. 3) of the casings 12 with each other, and fitting the protrusions 23 (in FIG. 3) of the ribs 21 (in FIG. 3) of the cells into the recesses 24 (in FIG. 3) of the corresponding ribs 21 (in FIG. 3) of the other cell. Further, the positive and negative terminals of contiguous cells are connected to each other by connecting conductors 32.

The module battery 31 has a structure in which aluminum end plates 33 are disposed on the side faces of the stack of the five cells connected in series as described above. The end plates 33 are coupled to each other by four rod-shaped binding members 34, thereby the cells are tightly bound to each other so as not to be separated by expansion of the electrode groups or an increased internal pressure of the cells. Each of the end plate 33 has reinforcing ribs 35. The dimensions of the end plates 33 and the binding members 34 are determined depending on the expansion force of the electrode group, the internal pressure of the battery, and the number of stacked cells. In the embodiments described below, the end plates 33 have a thickness of 3 mm, the ribs of the end plates have a height of 11 mm, and the binding members 34 have a rectangular section of 7×8 mm.

In the module battery configured as described above, vertically oblong spaces 36 are formed between the ribs 21 and 30. Spaces 37 corresponding to the height of the ribs 21 are formed between the end cells and the corresponding end plates 33.

The ribs 21 continuously elongate in the longitudinal directions of the casing. Alternatively, each rib may be divided into several sections. However, the configuration in which each rib is formed in a continuous manner is more preferable because the air flow direction can be constant so as to improve heat radiation.

[EXAMPLE 1]

An electrode material mixture containing nickel hydroxide powder as a main component was filled in a foamed nickel porous substrate. The substrate was pressed and then cut to a predetermined size, thereby producing a nickel positive electrode plate having a capacity of 10 Ah per one plate. Also, a powder of a hydrogen storage alloy of $MmNi_{3.6}Co_{0.7}Mn_{0.4}Al_{0.4}$(Mm: misch metal) was applied together with a binder to a punched metal. The punched metal was pressed and cut to a predetermined size, thereby producing a hydrogen storage alloy negative electrode having a capacity of 13 Ah per one plate.

Each of the positive and negative electrode plates was wrapped in a bag-shaped separator. Ten positive electrode plates and eleven negative electrode plates were alternately stacked to configure an electrode group. The positive and negative electrode plates were connected to respective terminals with lead members, and inserted into the casing. Then 180 cm$^3$ of an alkaline electrolyte was poured into the casing, thereby forming a cell described above.

In the casing 12, the side walls 18 have a thickness of 2 mm, the ribs 21 and 30 have a height of 1.5 mm, the ribs 21 have a width of 5 mm, the interval of the ribs is 12 mm, and the side walls 19 and the bottom wall 20 have a thickness of 4 mm. The lid 13 has a thickness of 4 mm.

The cell of the above-mentioned configuration was charged for 15 hours at a current of 10 A and then discharged at a current of 20 A until the cell voltage was lowered to 1.0 V, as an initial charging and discharging operation. As a result, the electrodes expanded and came into close contact with the side walls 18 of the casing 12. The capacity of the cell is defined by the positive electrode, and the cell has a battery capacity of 100 Ah. Five cells of such a configuration were used to form a module battery as shown in FIG. 4.

Effects of different proportions of a polymer alloy constituting a battery casing, on the performances, etc. of a module battery were investigated.

First, polymer alloys of PPE and PS in the blending proportions listed in Table 1 were synthesized. Using the polymer alloys, battery casings (Nos. 1 to 5) having the configuration described above were produced. Using polypropylene, similar battery casings were produced as comparative examples.

Tables 1 and 2 show principal physical properties of the polymer alloys and polypropylene, respectively.

TABLE 1

| No. | Weight ratio of PPE (wt %) | Heat distortion temperature (°C.) [at 1.82 MPa] | Creep strain (%) | MFR (g/10 min.) | Bending elastic modulus (MPa) |
| --- | --- | --- | --- | --- | --- |
| 1 | 10 | 85 | 2.5 | 15 | 1700 |
| 2 | 20 | 100 | 2.0 | 10 | 1900 |
| 3 | 40 | 120 | 0.9 | 6 | 2400 |
| 4 | 60 | 140 | 0.7 | 3 | 3000 |
| 5 | 80 | 160 | 0.4 | 1 | 3400 |

TABLE 2

| Sample resin | Heat distortion temperature (°C.) [at 1.82 MPa] | Bending elastic modulus (MPa) | Creep strain (%) |
| --- | --- | --- | --- |
| Polyethylene | 75 | 1300 | Broken |

The physical properties listed above were measured according to the following standards.

Heat distortion temperature: in accordance with JIS K-6871 (almost corresponding to ASTM D-648).

Creep strain: a strain after 1,000 hours from the application of a tensile load of 20 MPa in a tensile creep test according to JIS K-7115.

MFR: in accordance with JIS K-7210 (almost corresponding to ISO 1133 and ASTM 1238), under a temperature of 250° C. and a load of 1,000 g.

Bending elastic modulus: in accordance with JIS K-7203 (almost corresponding to ASTM D-790).

Sets of five cells having the battery casings listed above were produced, and module batteries shown in FIG. 4 were formed. The module batteries using resins Nos. 1 to 5 of Table 1 are respectively indicated as module batteries Nos. 1 to 5, and the module battery using polypropylene of Table 2 as module battery No. 6.

The module batteries were charged at a current of 10 A for 12 hours. After the charging process, the end cells of each module battery had an internal pressure of about 0.2 MPa. While maintaining the fully charged state or under the internal pressure of 0.2 MPa, preservation tests at 80° C. and 60° C. were conducted, and hours elapsed until the battery casing was broken by creep deformation were counted. The test results are listed in Table 3.

TABLE 3

| Module battery number | 80° C. | 60° C. |
| --- | --- | --- |
| Module battery No. 1 | Broken after 3,500 hours | Not broken before elapse of 10,000 hours or longer |
| Module battery No. 2 | Not broken before elapse of 4,300 hours | Not broken before elapse of 10,000 hours or longer |
| Module battery No. 3 | Not broken before elapse of 4,300 hours | Not broken before elapse of 10,000 hours or longer |
| Module battery No. 4 | Not broken before elapse of 4,300 hours | Not broken before elapse of 10,000 hours or longer |
| Module battery No. 5 | Not broken before elapse of 4,300 hours | Not broken before elapse of 10,000 hours or longer |
| Module battery No. 6 | Broken within 220 hours | Broken within 1,500 hours |

As seen from Table 3, module batteries Nos. 2 to 5 were free from breakage due to creep deformation even after an elapse of 4,300 hours at 80° C. or 10,000 hours at 60° C. By contrast, in module battery No. 6 which is the comparative example and uses a polypropylene battery casing, the side or bottom walls of all the five cells were broken by creep deformation within 200 hours at 80° C. or 1,500 hours at 60° C. Among the batteries using the polymer alloys, the battery in which the polymer alloy containing 10 wt % of PPE was broken after 3,500 hours at 80° C.

The above-mentioned results can be explained from the physical properties of the resins listed in Tables 1 and 2. When polypropylene is subjected to a creep test in accordance with JIS K-7115, the creep strain after a tensile load of 20 MPa after 1,000 hours is 10% or more, and polypropylene casing becomes substantially broken. In contrast, module batteries Nos. 2 to 5 using a polymer alloy of PPE and PS in which the proportion of PPE is 20 wt % or more produce a creep strain of 2% or less in the same test, or have a very excellent creep resistivity. The polymer alloy containing 10 wt % of PPE has a low heat distortion temperature, and in a creep test in accordance with JIS K-7115, the creep strain after 1,000 hours at a tensile load of 20 MPa is 2% or more, resulting in an impaired creep resistivity. As seen from the results, a sealed alkaline storage battery using a battery casing made of a polymer alloy of PPE and PS exhibits excellent creep resistivity even under severe high temperature environments, and hence has sufficient long-term reliability under actual service environments.

From the above-mentioned description, it is appropriate to use, as a polymer alloy for a battery casing, a polymer alloy of PPE and PS in which the creep strain after a tensile load of 20 MPa after 1,000 hours is 2% or less by a creep test according to JIS K-7115, and the proportion of PPE is 20 wt % or more, preferably 30 wt % or more.

Furthermore, from Table 1, it will be seen that a more excellent creep resistivity is attained with a higher proportion of PPE and a higher heat distortion temperature.

Module batteries Nos. 1 to 6 were subjected to a discharge capacity test and a cycle life test. The discharge capacity test was conducted in such a manner that batteries were charged at a current of 10 A for 12 hours, allowed to stand for 1 hour, and then discharged at a current of 20 A until the voltage was lowered to 5 V. The discharge capacity of each module battery was calculated based on the discharge time elapsed until the voltage was lowered to 5 V. With respect to the cells, the discharge capacity was calculated based on the discharge time elapsed until the voltage was lowered to 1 V. During the charging process, the spaces between the cells, the side faces, and the surfaces of the end plates in each module battery were exposed to an air flow from below the battery by means of a fan. The fan capacity was regulated so that an average velocity of the air flow passing through the spaces 36 was 1.0 m/s. The environmental temperature was 20° C., The test results are shown in Table 4.

The cycle life test was conducted by repeating the same conditions as the charging and discharging conditions under which the discharge capacity was investigated. The test results are shown in Table 4.

TABLE 4

| Module battery number | Bending elastic modulus (MPa) | Discharge capacity (Ah) | Life (cycle) |
| --- | --- | --- | --- |
| No. 1 | 1700 | 94 | 700 |
| No. 2 | 1900 | 96 | 850 |
| No. 3 | 2400 | 98 | 900 |
| No. 4 | 3000 | 98 | 925 |
| No. 5 | 3400 | 98 | 950 |
| No. 6 | 1300 | 88 | 350 |

As obvious from Table 4, in module battery No. 6 using the battery casing made of polypropylene of which the bending elastic modulus is 1,300 MPa, the rigidity of the casing against the internal pressure is low and hence the casing is deformed. Therefore, a heat insulation layer by means of air is formed between the electrode plates and the casing, and the width of the inter-cell space through which air flows is reduced, thereby impairing the radiation efficiency of heat generated in the electrode group. This lowers the charging efficiency of the positive electrode, with the result that the discharge capacity is reduced to 88 Ah and the cycle life is shortened. As compared with module batteries Nos. 2 to 5, module battery No. 1 using the battery casing with PPE of 10 wt % has a slightly lower discharge capacity and the cycle life is shorter. In contrast, module batteries Nos. 2 to 5 with 20 wt % or more PPE have excellent performances in discharge capacity and cycle life.

From the above-mentioned description, it is appropriate to use, as a polymer alloy with 20 wt % or more PPE, with the bending elastic modulus of 1,900 MPa or higher, and with the heat distortion temperature of 100° C. or higher. Preferably, desirable proportion of PPE is 30 wt % or more.

[EXAMPLE 2]

Next, fractions defective of molding product sets each consisting of 200 battery casings which were molded by the injection molding technique with using the five kinds of polymer alloys of PPE and PS shown in Table 1 were compared with each other.

Table 1 shows proportions of PPE and MFRs of the molding products. The MFRs were measured in accordance with JIS K-7210 (almost corresponding to ISO 1133 and ASTM D-1238), at a temperature of 250° C. and under a load of 1,000 g.

First, pellets were dried in a constant temperature chamber at 100° C. for 2 hours. Under the same conditions that the molding temperature was 280° C., the mold temperature was about 80° C., and the injection pressure was about 100 MPa, the injection molding processes were conducted. Products with a sink mark, a burr, a flow mark, a weld-mark, discoloration, defects in shape, a large residual strain or warpage were judged as defectives. The test results are shown in Table 5.

TABLE 5

| Module battery number | Weight ratio of PPE | Number of defectives | Fraction defective (%) |
| --- | --- | --- | --- |
| No. 1 | 10 | 1 | 0.5 |
| No. 2 | 20 | 2 | 1.0 |
| No. 3 | 40 | 5 | 2.5 |
| No. 4 | 60 | 10 | 5.0 |
| No. 5 | 80 | 50 | 25 |

As apparent from Table 5, battery casing No. 5 in which the proportion of PPE is 80 wt % have a very high fraction defective. This is because, when the proportion of PPE is 80 wt %, the MFR has a value of 1 g/(10 min.) or low, thereby producing many defectives. Battery casings Nos. 1 to 4 have a low fraction defective, and hence can be used practically.

From the above-mentioned description, a battery casing in which the proportion of PPE is 60 wt % or less, preferably 50 wt % or less is easy to produce and suitable for a practical use.

As is apparent from the above-mentioned discussion, polymer alloys of PPE and PS in which the proportion of PPE is 80 wt % has an MFR of 1 g/(10 min.). When battery casings made of such polymer alloys are produced by the injection molding technique, the MFR is very low resulting in many defectives.

In contrast, polymer alloys in which the proportion of PPE is 10 wt % or less has an MFR of 15 g/(10 min.) or higher. Therefore, battery casings of such polymer alloys can easily be produced by the injection molding technique or the like. In the battery casings, however, the heat distortion temperature is low, and also the bending elastic modulus and the creep resistivity are low, with the result that the discharge capacity and the cycle life are tend to be impaired.

In view of the above, a recommended range of proportion of PPE is 20 to 60 wt %, and preferably the proportion of 30 to 50 wt % was found optimum in view of its low fraction defective. Furthermore, the optimum one is a polymer alloy in which the bending elastic modulus is 1,900 to 3,000 MPa, the flexural strength is 50 to 100 MPa, the heat distortion temperature at a load of 1.82 MPa in accordance with JIS K-6871 is 100° C. or higher; and when the tensile load in a tensile creep test according to JIS K-7115 is 10 MPa, the creep strain after 1,000 hours is 2% or less.

[EXAMPLE 3]

Next, five processes were made each of which battery casings and lids were subjected to a weld sealing process. The processes were made for five kinds of polymer alloys of PPE and PS shown in Table 1 and temperatures of a heating plate which is temporarily inserted between the battery casing and the lid for heating them for respective processes for the five kinds of polymer alloys were compared with each other. In this Example, the period when the casing and the lid were made contact with the heating plate was set to 20 sec, and the lowest temperatures of the heating plate for enabling the welded zone to attain equal mechanical strength to that of the battery casing or the lid were measured. Several ten module batteries were produced by conducting the thermal welding at the temperature of the heating plate, and the resulting battery was checked whether an internal short-circuit occurred or not. The test results are shown in Table 6.

TABLE 6

| Number | Weight ratio of PPE (wt %) | Heating plate temperature (°C.) | Internal short-circuit |
|---|---|---|---|
| NO. 1 | 10 | 260 | No |
| No. 2 | 20 | 280 | No |
| No. 3 | 40 | 300 | No |
| No. 4 | 60 | 320 | No |
| No. 5 | 80 | 340 | Short-circuit occurred at two places |

As seen from Table 6, the higher heating plate temperature is set with the higher proportion of PPE. This is because, as the proportion of PPE is increased, the glass transition temperature and the heat distortion temperature are raised. In module battery No. 5, the heating plate temperature in the thermal welding process is high. When the casing of the battery and the lid were thermally welded to each other, the upper portions of the separators constituting the electrode group were burned. As a result, two defective module batteries in which an internal short-circuit occurred were found.

By contrast, in module batteries Nos. 1 to 4 respectively using battery casings Nos. 1 to 4, the separators constituting the electrode group were not burnt, resulting in that all the module batteries were free from an internal short-circuit or were non-defective. That is, module battery No. 5 was found to have a danger that the separators constituting the electrode group are burned in the heating process for thermal welding, and hence is not suitable for a practical use.

From the above-mentioned description, a polymer alloy of PPE and PS in which the proportion of PPE is 60 wt % or less is excellent in workability and suitable for a practical use.

[EXAMPLE 4]

Battery casings made of polymer alloys which mainly contain PPE and PS and to which an elastomer is added were investigated with respect to impact resistivity. Four kinds of battery casings in which the proportion of PPE is 40 wt % and the proportions of PS and the elastomer are varied were produced.

Using the casings, module batteries having the same configuration as that of Example 1 were produced. The module batteries were designated as module batteries Nos. 7 to 10, respectively. Module batteries Nos. 7 to 10 were compared in impact resistivity with each other. The results are shown in Table 7.

TABLE 7

| No. | Weight ratio of PPE (wt %) | Weight ratio of PS (wt %) | Weight ratio of elastomer (wt %) | Izod impact value (J/m) | Bending elastic modulus (MPa) |
|---|---|---|---|---|---|
| 7 | 40 | 60 | — | 190 | 2400 |
| 8 | 40 | 53 | 7 | 240 | 2200 |
| 9 | 40 | 45 | 15 | 380 | 2000 |
| 10 | 40 | 25 | 35 | 500 | 1750 |

With respect to these module batteries, and module battery No. 11 which uses a casing made of polypropylene and is configured in the same manner as Example 1, the end plates of each module battery are fixed. Using an impact testing machine, a lateral impact which has a half-amplitude trapezoidal wave and the maximum acceleration of 490 m/sec$^2$ was applied to each module battery. The broken conditions of the module batteries were compared with each other. The condition is used as an index of safety in the case where such a battery is used in an automobile and collision occurs. Usually, the Izod impact value of 150 to 200 J/m or higher is required. The results are shown in Table 8.

TABLE 8

| Module battery number | Results of impact test |
|---|---|
| No. 7 | Whitening (plastic deformation) was observed at many portions |
| No. 8 | Whitening (plastic deformation) was observed |
| No. 9 | Whitening (plastic deformation) was observed |
| No. 10 | Whitening (plastic deformation) was observed |
| No. 11 | Breakage was observed, and alkaline electrolyte leaked |

As shown in Table 8, module batteries Nos. 7 to 10 using a casing made of the polymer alloy to which an elastomer is added have resistance to impact and were not broken. In contrast, module battery No. 11 using a casing made of polypropylene was broken causing leakage of the alkaline electrolyte, thereby inducing a problem against safety. This can be explained from the physical properties of the casing materials shown in Table 7. Casings Nos. 8 to 10 have an Izod impact value of 240 to 500 J/m or resistance to an impact. In contrast, the casing made of polypropylene has an Izod impact value as low as 110 J/m or a weak impact resistivity. Casing No. 10 has an excellent impact resistance but has a small bending elastic modulus of 1,750 MPa, and hence is not suitable in view of Example 1.

From the above-mentioned results, by using a polymer alloy mainly comprising PPE and PS and added with an elastomer in a proportion of 15 wt % or less, a casing which has an improved impact resistance and is more suitable as a mobile power source can be obtained.

[EXAMPLE 5]

Using the above-mentioned casing materials, effects of the structure of a casing on battery characteristics were investigated. As the battery characteristics, the discharge capacity and the cycle life were measured under the same conditions as those described above. In the measurements, unless otherwise specified, the side walls 18 have a thickness of 2 mm, the ribs 21 and 30 have a height of 1.5 mm, the ribs 21 have a width of 5 mm, the interval of the ribs 21 is 12 mm, the side walls 19 and the bottom wall 20 have a thickness of 4 mm, and the lid 13 has a thickness of 4 mm.

First, effect of the heights of the ribs 21 and 30 were investigated. The results are shown in Table 9.

TABLE 9

| Module battery number | Height of ribs (mm) | Discharge capacity (Ah) | Life (cycle) |
| --- | --- | --- | --- |
| No. 12 | 0 | 85 | 120 |
| No. 13 | 0.5 | 88 | 310 |
| No. 14 | 1 | 98 | 900 |
| No. 15 | 2 | 98 | 900 |
| No. 16 | 3 | 90 | 720 |

In module battery No. 12 which is not provided with the ribs 21 and 30, and module battery No. 13 in which the ribs 21 and 30 have a height of 0.5 mm, the efficiency of heat radiation through the casing surface is poor so that the discharge capacity and the cycle life were largely impaired. By contrast, in module battery No. 16 in which the ribs 21 and 30 have a height of 3 mm, the spaces 36 between the cells were increased in volume so that the velocity of air flow passing through the spaces 36 was lowered, and the air flow was changed to a laminar flow, whereby the heat radiation efficiency was lowered. As a result, the discharge capacity and the cycle life were impaired. The ribs 21 and 30 were increased in weight, so that the volume energy density was decrease.

Module batteries Nos. 14 and 15 in which the ribs 21 and 30 have a protrusion height of 1 or 2 mm exhibited satisfactory performances. From this, the optimum protrusion height of the ribs is 1 to 2 mm.

Next, the interval of the ribs 21 was investigated. The results are shown in Table 10.

TABLE 10

| Module battery number | Interval of ribs (mm) | Discharge capacity (Ah) | Life (cycle) |
| --- | --- | --- | --- |
| No. 17 | 5 | 85 | 380 |
| No. 18 | 7 | 98 | 900 |
| No. 19 | 15 | 98 | 900 |
| No. 20 | 20 | 88 | 410 |

In module battery No. 17 in which the interval of the ribs 21 is 5 mm, the ribs cover a larger area of the casing surface, and therefore the heat radiation efficiency is lowered, whereby the discharge capacity and the cycle life were largely impaired. By contrast, in module battery No. 20 in which the interval of the ribs 21 is 20 mm, the casing was deformed because of insufficient strength. Furthermore, the spaces 36 between the cells were increased in volume so that the velocity of air flow passing through the spaces 36 was lowered, whereby the efficiency of heat radiation was lowered. As a result, the discharge capacity and the cycle life were largely impaired.

Module batteries Nos. 18 and 19 in which the interval of the ribs 21 is 7 or 15 mm exhibited satisfactory performances. From this, the optimum interval of the ribs is 7 to 15 mm.

Further, the width of the ribs 21 was investigated. The results are shown in Table 11.

TABLE 11

| Module battery number | Width of ribs (mm) | Discharge capacity (Ah) | Life (cycle) |
| --- | --- | --- | --- |
| No. 21 | 1 | 98 | 350 |
| No. 22 | 3 | 98 | 900 |
| No. 23 | 10 | 98 | 900 |
| No. 24 | 15 | 85 | 380 |

Module batteries Nos. 22 and 23 in which the widths of the ribs are respectively 3 and 10 mm exhibited satisfactory performances. In contrast, module battery No. 21 in which the width of the ribs 21 is 1 mm had a satisfactory discharge capacity, but there occurred slippage during the cycle life test, and the restraint effect was lost, with the result that the cycle life was largely shortened. On the other hand, in module battery No. 24 in which the width of the ribs 21 is 15 mm, the ribs cover a larger area of the casing surface, and therefore the heat radiation efficiency is lowered, whereby the discharge capacity and the cycle life were largely impaired. From this, the optimum width of the ribs is 3 to 10 mm.

Further, the thickness of the casing portions between the ribs 21 was investigated. The results are shown in Table 12.

TABLE 12

| Module battery number | Interval of ribs (mm) | Discharge capacity (Ah) | Life (cycle) |
| --- | --- | --- | --- |
| No. 25 | 0.5 | 85 | 380 |
| No. 26 | 1 | 98 | 900 |
| No. 27 | 3 | 98 | 900 |
| No. 28 | 5 | 88 | 400 |

Module batteries Nos. 26 and 27 in which the thickness of the inter-rib portions is 1 or 3 mm exhibited satisfactory performances. By contrast, in module battery No. 25 in which the thickness of the inter-rib portions is 0.5 mm, the battery casing was expanded and deformed because of insufficient strength so that a heat insulation layer by means of air was formed between the power generating elements and the battery casing, whereby the rate of heat conduction to the battery casing was lowered. Therefore, the discharge capacity and the cycle life were impaired. In module battery No. 28 in which the thickness of the inter-rib portions is 5 mm, the increased resin thickness reduces the heat radiation efficiency so that the discharge capacity and the cycle life are impaired. From this, it is optimum to set the thickness of the inter-rib portions of the casing to 1 to 3 mm.

Similarly, the thickness of the side walls were investigated. The results are shown in Table 13.

TABLE 13

| Module battery number | Side walls t (mm) | Discharge capacity (Ah) | Life (cycle) |
| --- | --- | --- | --- |
| No. 29 | 1 | 98 | 110 |
| No. 30 | 2 | 98 | 900 |
| No. 31 | 4 | 98 | 900 |
| No. 32 | 6 | 94 | 620 |

Module batteries Nos. 30 and 31 in which the thickness of the side walls is 2 or 4 mm exhibited satisfactory performances. By contrast, module battery No. 29 in which the side walls have a thickness of 1 mm, cracks occurred in the casing because the strength against a stress in the stacking direction of the electrode plates is insufficient. In module battery No. 32 in which the side walls have a thickness of 6 mm, the increased resin thickness reduces the heat radiation efficiency so that the discharge capacity and the cycle life are impaired. From this, it is optimum to set the thickness of the short side faces of the casing to 2 to 4 mm.

Consequently, the use of the above-mentioned polymer alloys allows a relatively large capacity sealed alkaline storage battery to be configured which is practically useful and in which the side walls in the stacking direction of the casing of a module battery have a thickness of 1 to 3 mm, the ribs for forming spaces for a cooling air passage between cells have a height of 1 to 2 mm, the interval of the ribs is 10 to 15 mm, the width of the ribs is 3 to 10 mm, and the thickness of the short side faces of the casing is 2 to 4 mm.

When taking into account the strength of the battery casing and that of the zone where the lid is welded to the casing, it is preferable to set the operating pressure of the safety vent to 0.2 to 0.8 MPa. In the case where the operating pressure of the safety vent is set to higher than 0.8 MPa, the battery casing or the welding zone of the lid and the casing will be broken. Even in the case where the charging rate is 0.1 C, it is difficult to regulate the internal pressure of a battery so as to be lower than 0.2 MPa. In view of the battery performances and the reliability of the battery casing, therefore, the operating pressure of the safety vent is preferably from 0.2 to 0.8 MPa.

According to the sealed alkaline storage battery of the invention, the mechanical strength of the battery casing is improved so that the breakage due to creep deformation or mechanical fatigue caused by an internal pressure variation owing to repetitive charging and discharging processes conducted outdoors and under a high temperature environment is prevented from occurring. Accordingly, long-term reliability and safety can be enhanced.

The improvement of the mechanical strength can prevent the battery casing from being expanded or deformed by the internal pressure rise during the charging process or the expansion of the electrode group. The heat generated in the battery during charging and discharging processes can efficiently be dissipated to the outside of the battery through the battery casing. Consequently, the cells are prevented from being scattered in discharge capacity and the cycle life is prevented from being shortened.

It is understood that various other modifications will be apparent to and can be readily made by those skilled in the art to which this invention pertains without departing from the scope and spirit of this invention. Accordingly, it is not intended that scope of the claims appended hereto be limited to the description as set forth herein, but rather that the claims be construed as encompassing all the features of patentable novelty that reside in the present invention, including all features that would be treated as equivalents thereof, by those skilled in the art to which this invention pertains.

What is claimed is:

1. A sealed alkaline storage battery comprising a cell in which power generating elements and an alkaline electrolyte are accommodated in a battery casing of a synthetic resin, which is provided with a safety vent, wherein said casing is of a polymer alloy which comprises polyphenylene ether and polystyrene.

2. A sealed alkaline storage battery in accordance with claim 1, wherein said polymer alloy further contains an elastomer for providing the elastomer-containing polymer alloy with rubber elasticity and a lowered glass transition temperature.

3. A sealed alkaline storage battery in accordance with claim 2, wherein the proportion of said elastomer contained in said polymer alloy is 15 wt % or less, based on the weight of the elastomer-containing polymer alloy.

4. A sealed alkaline storage battery in accordance with claim 1, wherein the proportion of said polyphenylene ether in said polymer alloy is 20 to 60 wt %.

5. A sealed alkaline storage battery in accordance with claim 1, wherein said polymer alloy has a bending elastic modulus of 1,700 to 3,400 MPa, flexural strength of 50 to 100 MPa, and creep strain of 2% or less after a tensile load of 10 MPa for 1,000 hours by a tensile creep test according to JIS K-7115.

6. A sealed alkaline storage battery in accordance with claim 1, which further comprises a plurality of cells whose casings are stacked in one direction, so as to provide plural spaces for passage of a cooling medium flow, said plural spaces being formed between adjacent wide side wall surfaces of the casings of the contiguous cells by a plurality of protrusion ribs which are formed on at least one adjacent wide side wall surface of each casing.

7. A sealed alkaline storage battery in accordance with claim 6, wherein said ribs have a protrusion height of 1 to 2 mm, a width of 3 to 10 mm and are disposed with intervals of 7 to 15 mm, and wherein each casing has portions between said ribs having a thickness of 1 to 3 mm.

8. A sealed alkaline storage battery in accordance with claim 6, wherein each casing has narrow side walls that have a thickness of 2 to 4 mm.

9. A sealed alkaline storage battery in accordance with claim 1, wherein an operating pressure of said safety vent is 0.2 to 0.8 MPa.

10. A sealed alkaline storage battery comprising a cell in which power generating elements and an alkaline electrolyte are accommodated in a battery casing of a synthetic resin, and which is provided with a safety vent, wherein said casing is a polymer alloy which comprises polyphenylene ether and polystyrene and further contains an elastomer of 15 wt % or less, based on the weight of the elastomer-containing polymer alloy.

11. A sealed alkaline storage battery in accordance with claim 10, wherein said polymer alloy has a bending elastic modulus of 1,700 to 3,400 MPa, flexural strength of 50 to 100 MPa, and creep strain of 2% or less after a tensile load of 10 MPa for 1,000 hours by a tensile creep test according to JIS K-7115.

12. A sealed alkaline storage battery in accordance with claim 10, wherein an operating pressure of said safety vent is 0.2 to 0.8 MPa.

13. A sealed alkaline storage battery in accordance with claim 10, which further comprises a plurality of cells whose casings are stacked in one direction, so as to provide plural spaces for passage of a cooling medium flow, said plural spaces being formed between adjacent wide side wall surfaces of the casings of the contiguous cells by a plurality of protrusion ribs which are formed on at least one adjacent wide side wall surface of each casing.

14. A sealed alkaline storage battery in accordance with claim 13, wherein said ribs have a protrusion height of 1 to 2 mm, a width of 3 to 10 mm and are disposed with intervals of 7 to 15 mm, and wherein each casing has portions between said ribs having a thickness of 1 to 3 mm.

15. A sealed alkaline storage battery in accordance with claim 13, wherein each casing has narrow side walls that have a thickness of 2 to 4 mm.

\* \* \* \* \*